(12) United States Patent
Pellenc

(10) Patent No.: US 8,703,325 B2
(45) Date of Patent: Apr. 22, 2014

(54) BATTERY CONSISTING OF A PLURALITY OF CELLS POSITIONED AND CONNECTED TOGETHER WITHOUT WELDING

(75) Inventor: Roger Pellenc, Pertuis (FR)

(73) Assignee: PELLENC (Societe Anonyme), Pertuis (FR)

( * ) Notice: Subject to any disclaimer, the term of this patent is extended or adjusted under 35 U.S.C. 154(b) by 413 days.

(21) Appl. No.: 12/673,014

(22) PCT Filed: Sep. 2, 2008

(86) PCT No.: PCT/FR2008/001224
§ 371 (c)(1),
(2), (4) Date: Mar. 3, 2011

(87) PCT Pub. No.: WO2009/063143
PCT Pub. Date: May 22, 2009

(65) Prior Publication Data
US 2011/0177373 A1    Jul. 21, 2011

(30) Foreign Application Priority Data

Sep. 6, 2007  (FR) .................................... 07 06239

(51) Int. Cl.
*H01M 2/10* (2006.01)
*H01M 2/20* (2006.01)

(52) U.S. Cl.
USPC ............... 429/159; 429/96; 429/99; 429/100; 429/120

(58) Field of Classification Search
USPC ............................ 429/158, 159, 96–100, 120
See application file for complete search history.

(56) References Cited

U.S. PATENT DOCUMENTS

| | | | |
|---|---|---|---|
| 5,096,788 A * | 3/1992 | Bresin et al. ..................... | 429/99 |
| 5,104,754 A * | 4/1992 | Dorinski et al. ................ | 429/99 |
| 5,169,733 A | 12/1992 | Savovic et al. | |
| 5,225,292 A * | 7/1993 | Korinek et al. ................. | 429/82 |
| 6,340,877 B1 | 1/2002 | Mita et al. | |
| 2003/0064283 A1* | 4/2003 | Uemoto et al. ............... | 429/149 |
| 2004/0043287 A1* | 3/2004 | Bando et al. .................. | 429/156 |
| 2005/0079408 A1* | 4/2005 | Hirano ............................ | 429/82 |

FOREIGN PATENT DOCUMENTS

| | | |
|---|---|---|
| DE | 515051 | 1/1931 |
| DE | 4110984 | 10/1992 |
| EP | 1450422 | 8/2004 |
| FR | 2578103 | 8/1986 |
| GB | 359441 | 10/1931 |
| JP | 01232657 | 9/1989 |
| JP | 2001155702 A * | 6/2001 |

OTHER PUBLICATIONS

IPDL Machine Translation of the Detailed Description of JP 2001-155702A; Jun. 2001.*

* cited by examiner

*Primary Examiner* — Gregg Cantelmo
(74) *Attorney, Agent, or Firm* — Egbert Law Offices, PLLC

(57) ABSTRACT

The invention relates to a battery including a plurality of juxtaposed cylindrical or prismatic cells located in the through holes of a separating and positioning crate, characterized in that the separating and positioning crate is provided between two contact and holding plates having inner surfaces provided with one or more contact strips attached without welding against said faces and ensuring the electric interconnection between a plurality of cells. Said contact strip or each of said contact strips is made of a flexible conducting material having a plurality of flexible contact tabs cut in said contact strip(s) and maintained against the terminals of the cells by individual elastic pressure means secured by screwing onto the separating and positioning crate so that said contact tabs are individually pressed against one of the terminals or poles of said cells.

16 Claims, 12 Drawing Sheets

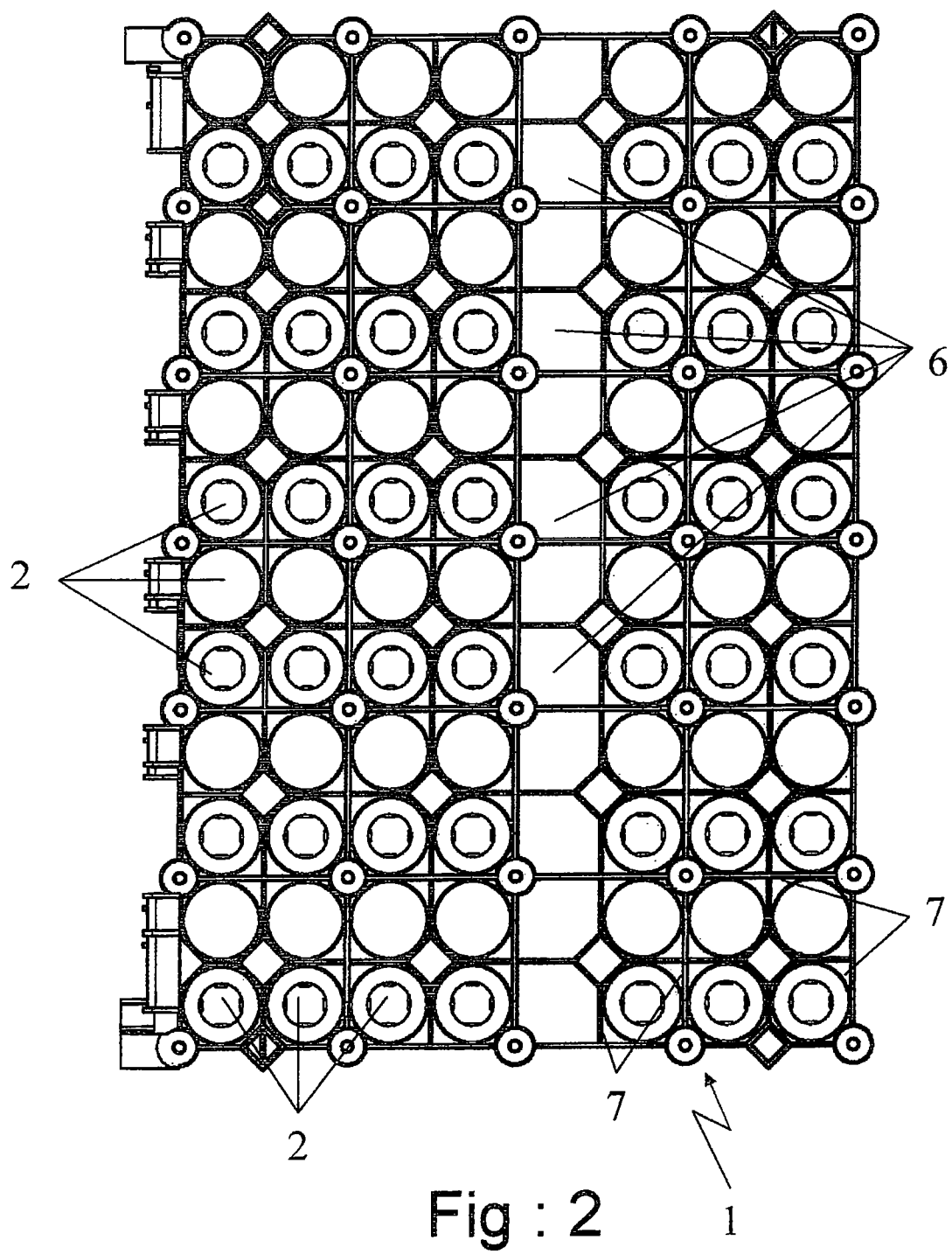
Fig : 2

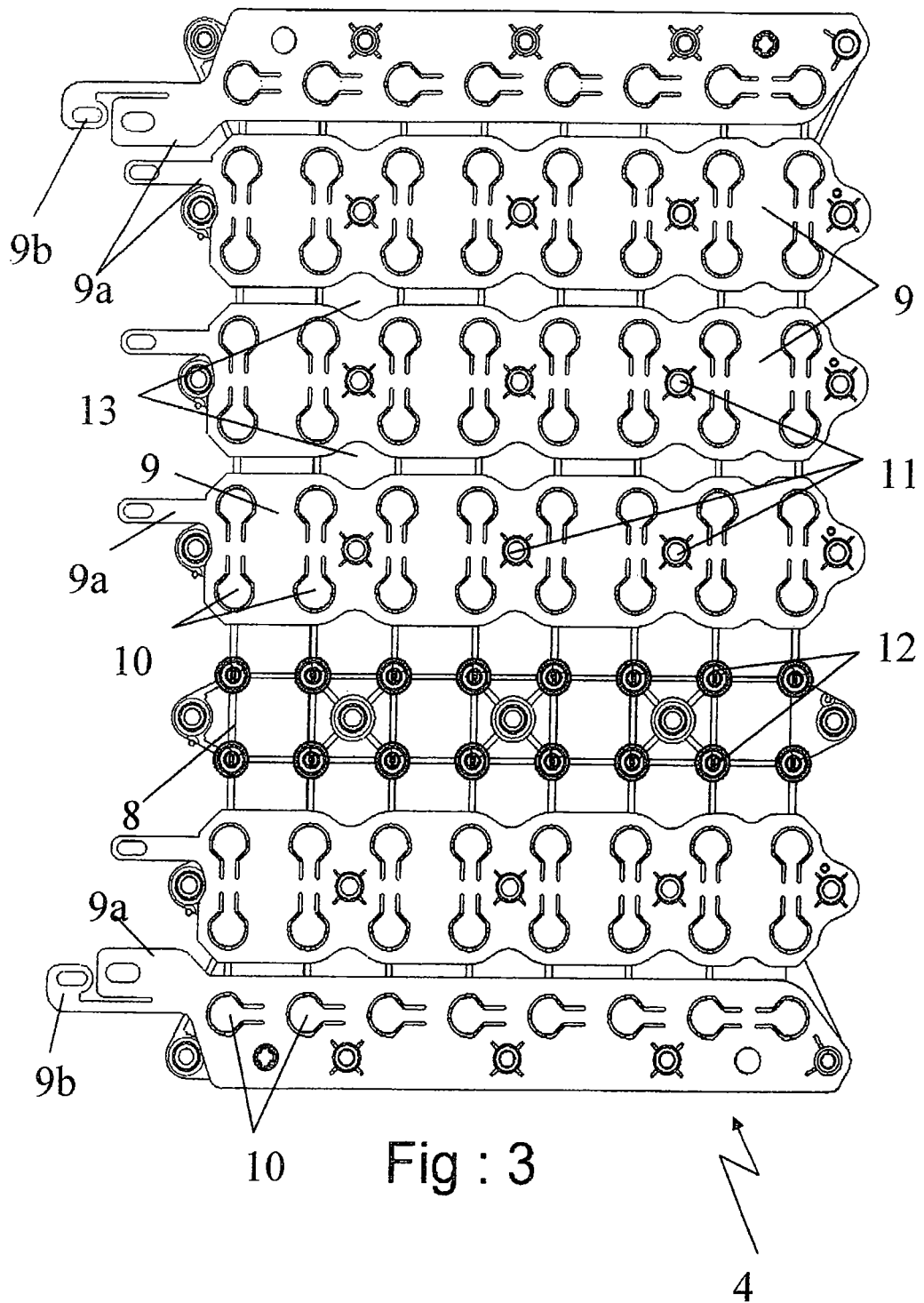
Fig : 3

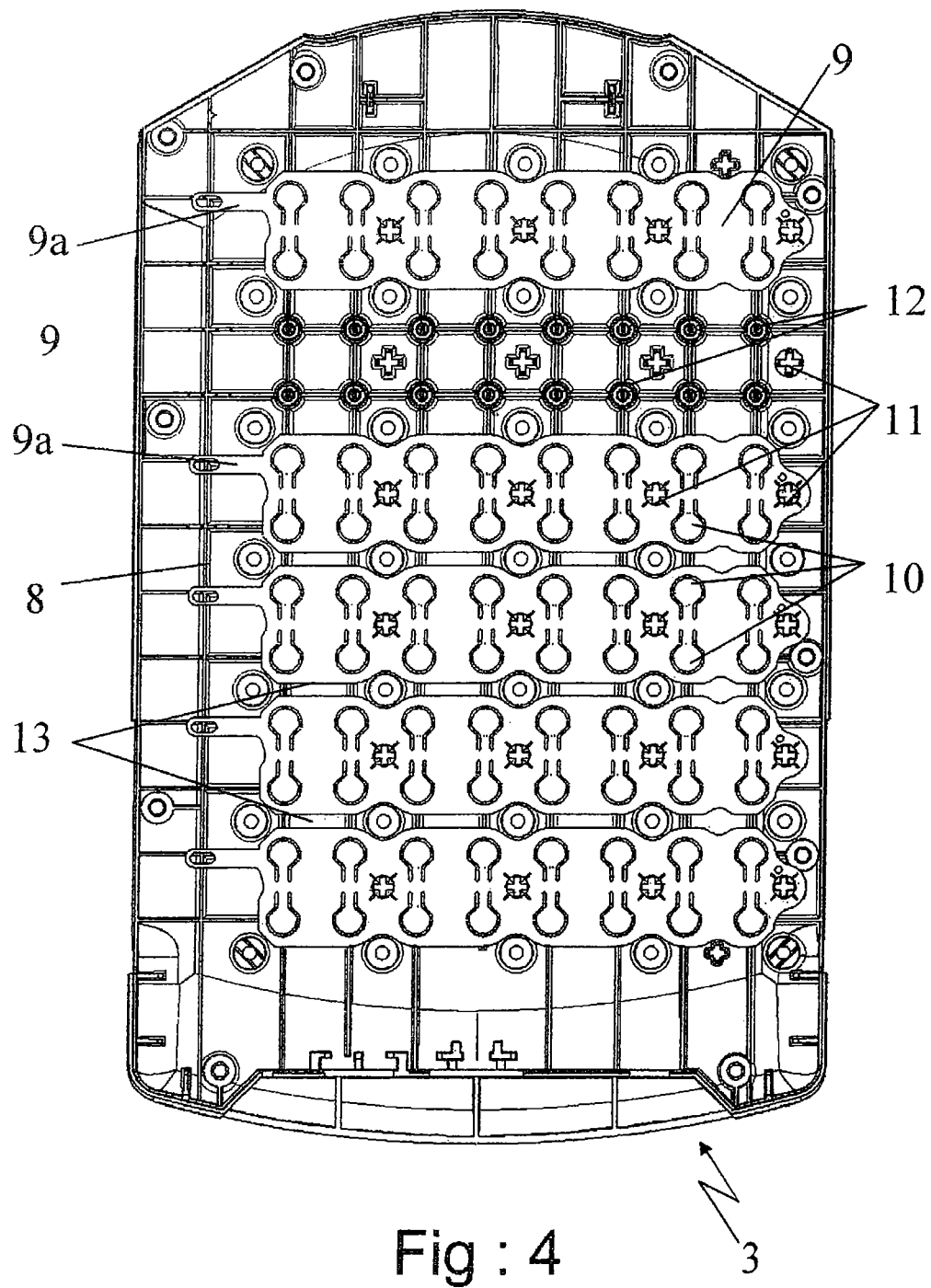
Fig : 4

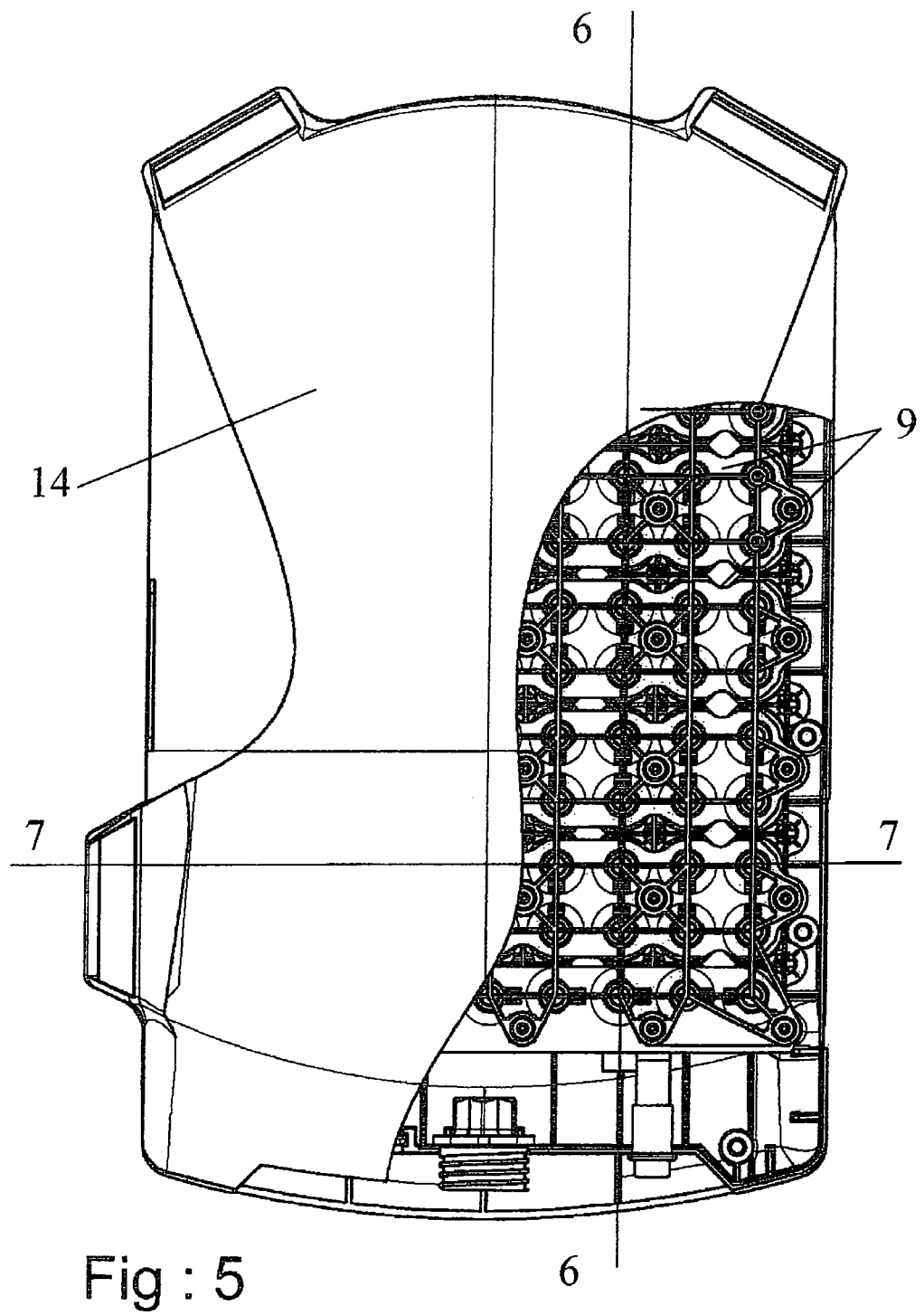
Fig : 5

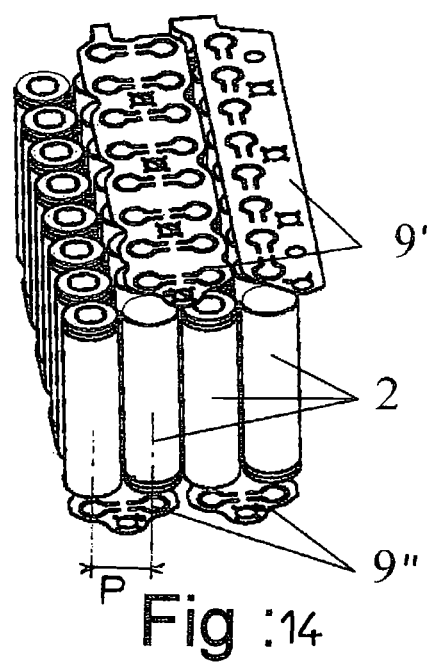
Fig :14
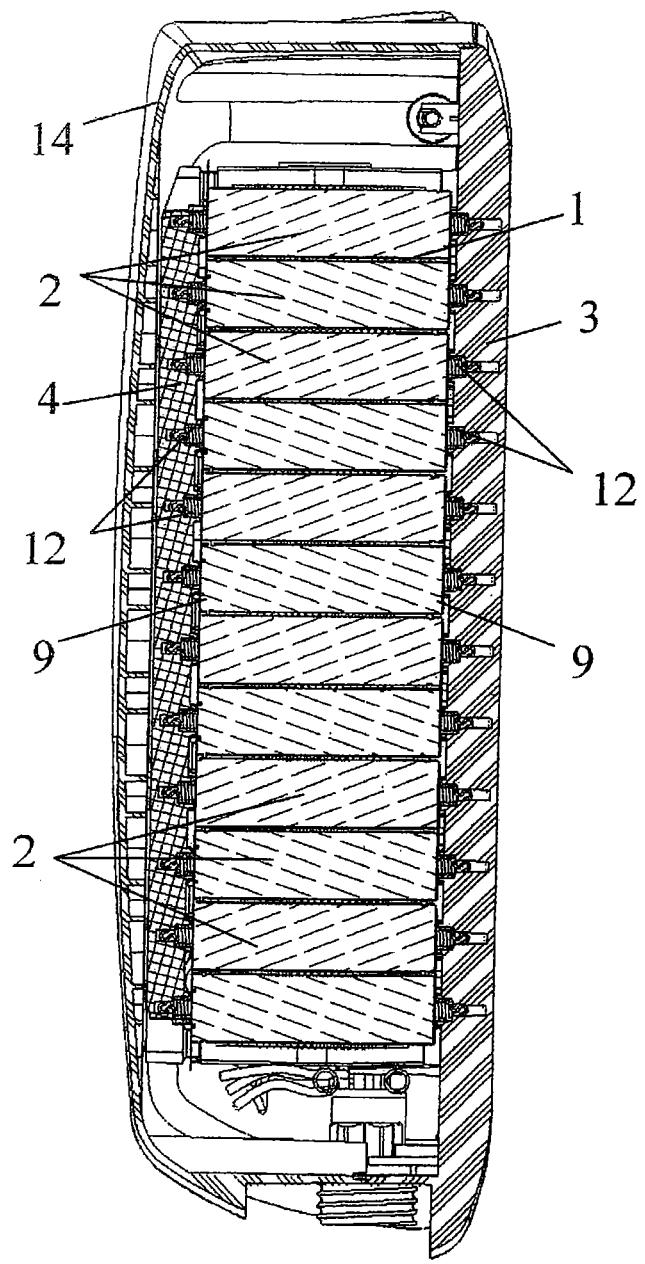
Fig :6

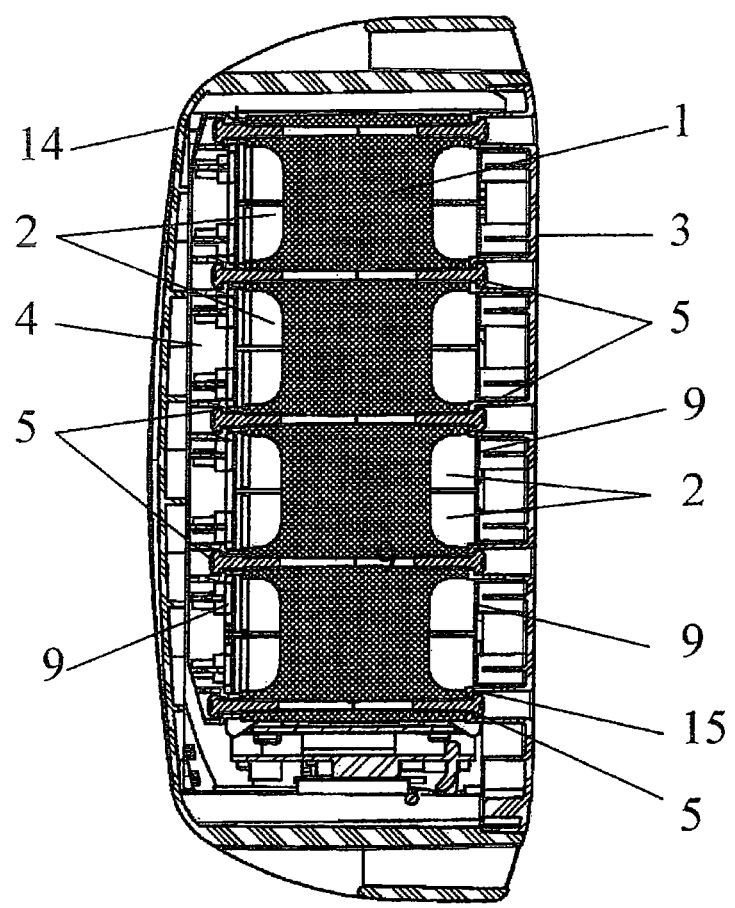
Fig : 7

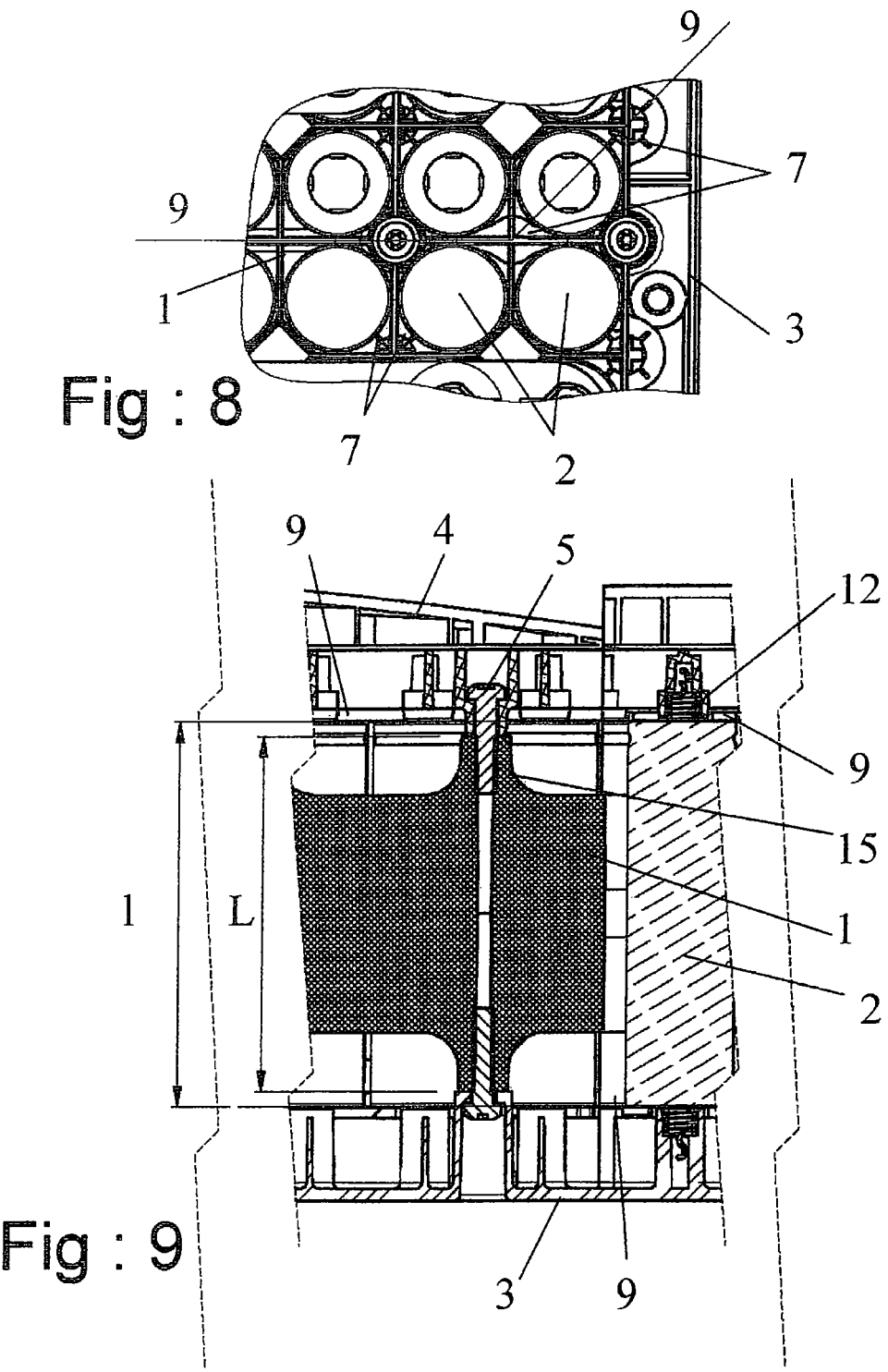

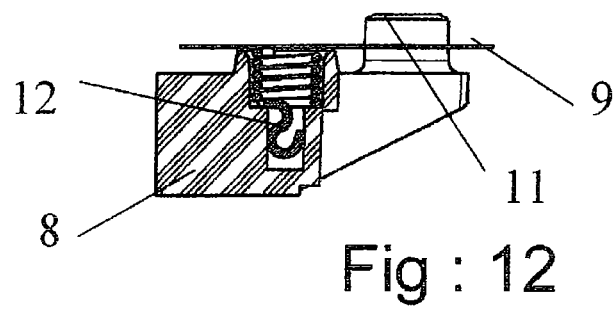
Fig : 12
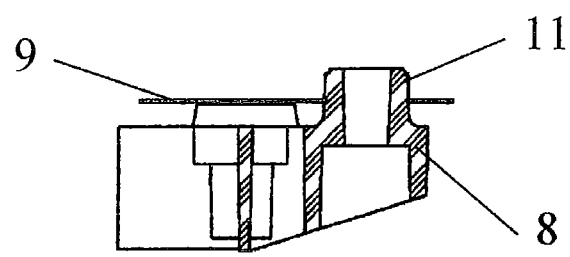
Fig : 11
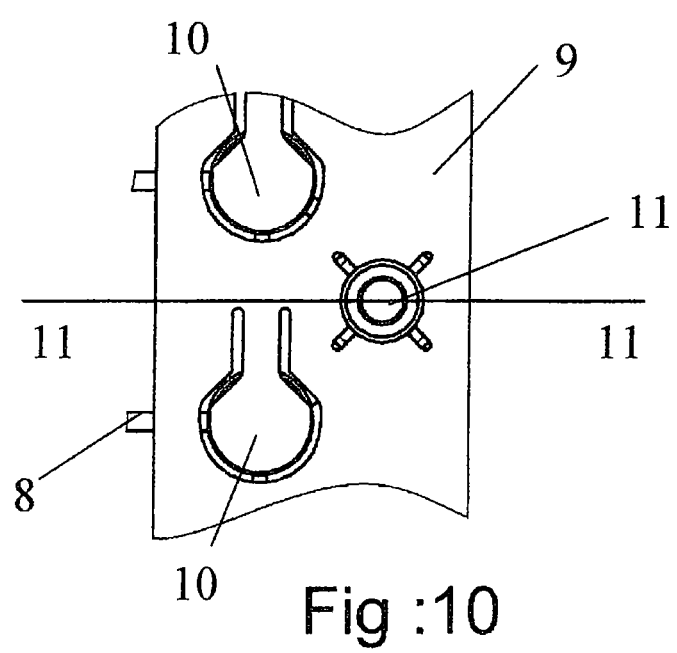
Fig : 10

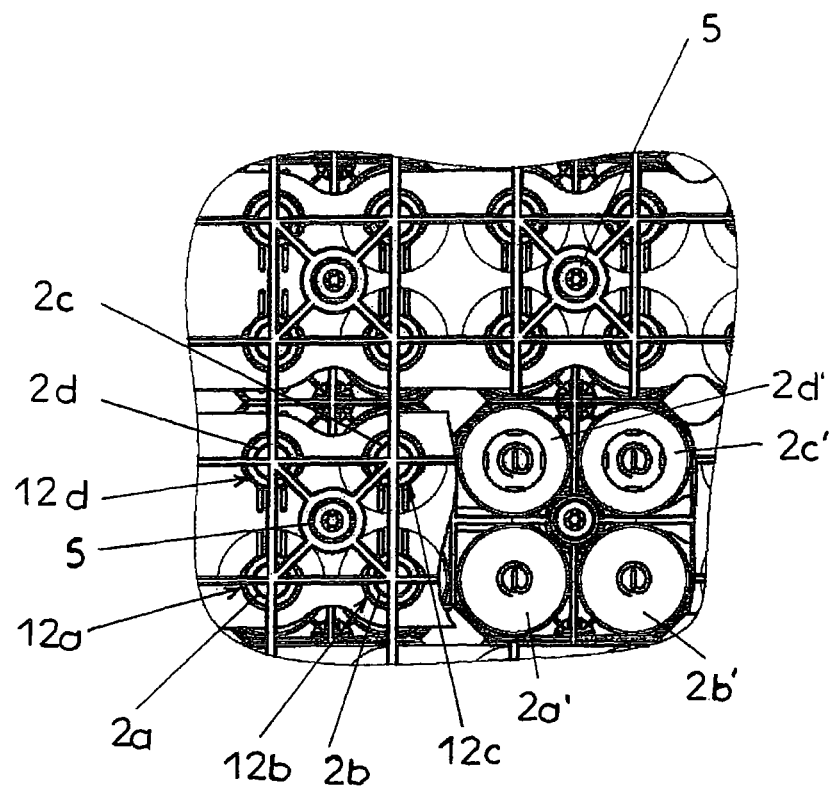
Fig :13

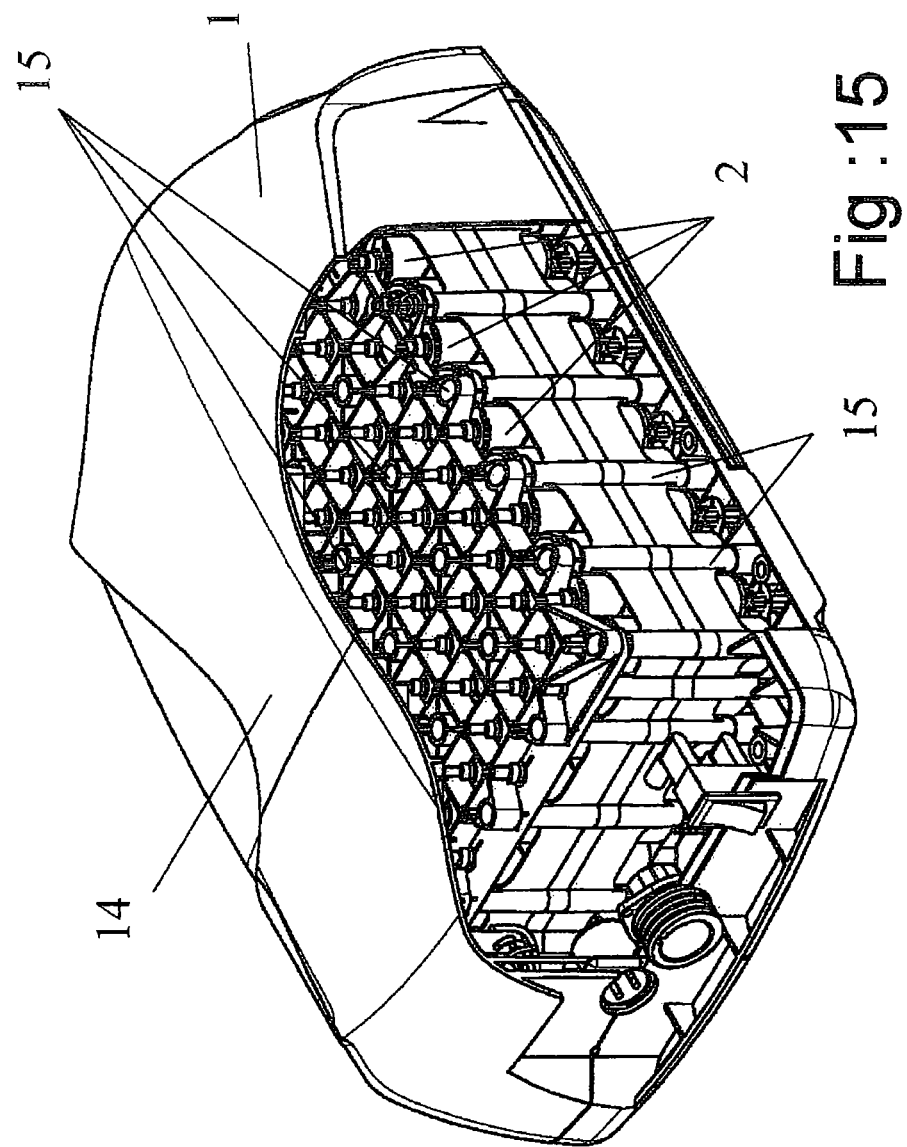

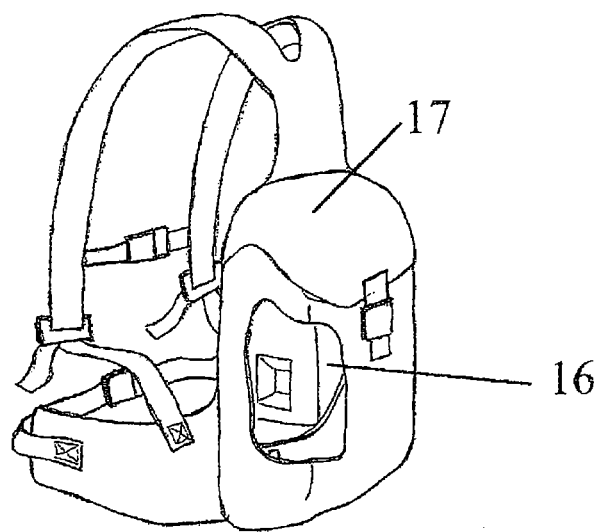
Fig : 16
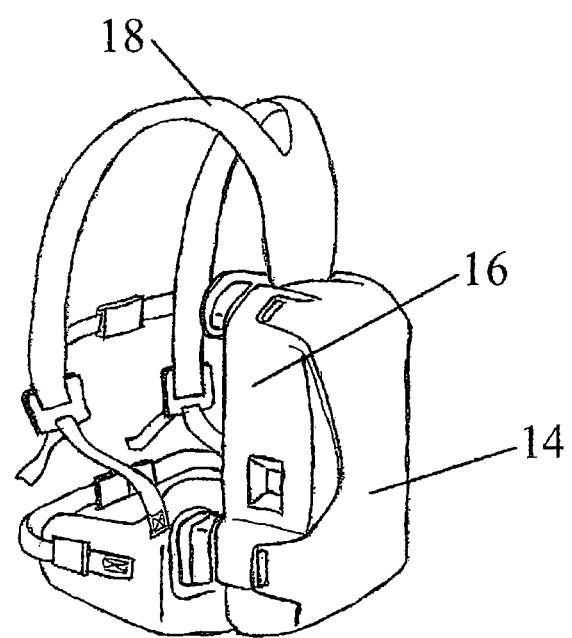
Fig : 17

BATTERY CONSISTING OF A PLURALITY OF CELLS POSITIONED AND CONNECTED TOGETHER WITHOUT WELDING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a battery including a plurality of cylindrical or prismatic cells positioned and connected together, without welding.

2. Description of Related Art Including Information Disclosed Under 37 CFR 1.97 and 37 CFR 1.98.

Current batteries, in particular those intended for storing the electric energy needed for driving motorized tools, include a large number of elements (sometimes in the hundreds) electrically connected together by contacts formed by conducting lamellae welded to the terminals of said elements which are separated by non-conductors and assembled in the form of packs by an adhesive tape. The manufacture of such batteries requires an assembly which is tedious, time-consuming and costly. Furthermore, they do not allow the replacement of one or several elements which might turn out to be defective, by customer-service or maintenance personnel.

In an application of manufacturing batteries including a small number of elements and intended for supplying the electric energy required for operating small portable equipment such as movie cameras, cameras, compact disc players, a battery without welding has been proposed (U.S. Pat. No. 5,096,788) which includes: a housing with a cover; a plurality of cells positioned in a pair of upper and lower alignment plates and seated in said housing, each cell having a positive and a negative terminal; a flex strip consisting of a single conducting sheet providing the interconnection between the plurality of cells; a first pressure element positioned between the interior surface of the bottom of the housing and a portion of said conducting flex strip; and a second pressure element placed between the cover and another portion of the conducting flex strip, each of said first and second pressure elements being equipped with elastic fingers, said elastic fingers being tilted toward the positive and negative terminals, so as to flatten said opposite portions of the conducting sheet against said terminals and to establish the interconnection of said plurality of cells.

The application of such a device to batteries including a large number of cells does not appear to be feasible. As a matter of fact, in such an application a device of this kind would present at least the following radical drawbacks. The batteries including a large number of cells (for example in the order of a hundred cells) assembled in a parallel connection, generate very strong electrical currents to be flowing through the interconnecting circuits (up to 100 Amperes) which cannot be done with flexstrips. The material used to produce the flexstrips (polyamide or polyester film) is very fragile and can be destroyed by the friction of the contact springs in case of slight movements, which would result in a loss of electrical contact. The springs as described summarily in document U.S. Pat. No. 5,096,788 (springs supposedly cut-outs from sheet metal) do not have sufficient travel and contact force to ensure an efficacious contact of the flex strip on the cell terminals; as a matter of fact, the manufacturing tolerances require a travel of 2 mm and the contact force must be in the order of 2 kg for the contact to be reliable, which cannot be obtained with the device described in the aforementioned document.

The cost of the flex strip is directly dependent on the surface of the latter; one can imagine that it would be very high, if the technology proposed in this document were applied to the manufacture of batteries consisting of a large number of cells to be connected (very large surface to be covered). According to this document, the battery can no longer be disassembled once the cover has been closed by a sealing process.

In an application for the manufacture of batteries including a reduced number of cells, it has been proposed (DE-515 051) to house these cells in a casing closed by a lid. According to this document, a plurality of small flexible tabs is fastened on the underside of the lid, so as to connect each cell with an adjacent cell once said lid is closed. Such a construction implies a very precise and lengthy assembly of the contact tabs which means it can hardly be considered for the manufacture of batteries featuring a large number of cells. Furthermore, the tabs are placed against the cell terminals only under the effect of their own elasticity, yet such pressure is insufficient to guarantee a perennially good contact which may contribute to a reduction in the life of batteries being used in an active manner for professional purposes.

Finally, an application for the manufacture of batteries including a large number of cells, it has been known (EP-1.450.422) to house these cells in a casing that is open on its two sides and to connect them, two by two, by way of small connecting plates that are welded on the opposite ends of said cells.

This connection method has the drawback of requiring elements or cells suitable for welding as well as specialized, costly tooling that is cumbersome and tricky to manipulate in order to execute multiple weldments. Another major drawback of this connection method is that it makes it impossible to disassemble the battery, for example in order to replace one or several defective elements.

Furthermore, the small connecting plates used in the device described by document EP-1 450 422 are not pushed against the poles of the battery elements by individual pressure-providing means but by a collective pressure device including plates of an elastic material such as rubber plates interposed between the terminals of the connected cells and the upper and lower cover plates. Such elastic plates are unable to guarantee continuity of the electrical contact between the small connecting plates and the elements or cells, particularly in case of broken welds.

The invention aims to manufacture batteries including a plurality of elements or cells that are juxtaposed and connected together, without welding or glue, in a simple manner that is faster, more economical, allows disassembly and is highly reliable.

BRIEF SUMMARY OF THE INVENTION

According to the invention, this aim has been achieved by means of a battery including a plurality of juxtaposed cylindrical or prismatic elements or cells that are individually seated in through-holes of a separating and positioning case. This battery being particularly notable in that these through-holes are of a length that is preferably less than that of the cells, so that the positive and negative terminals of said cells emerge from the open ends of the through-holes. This separating and positioning being placed between two contact and holding panels the interior faces of which being equipped with one or several fixed contact strips, without welding, against said faces and providing the electrical interconnection of a plurality of cells. This contact strip or each of the contract strips being made of a flexible conducting material and featuring a plurality of flexible contact tabs cut out in said contact strip(s) and held pressed against the cell terminals, by individual elastic pressure devices spread over the interior face of the contact and holding panels which are screwed into the separating and positioning case, so that said contact tabs are pressed individually against one of the terminals or poles of said cells.

It is clear that the mechanical assembly of the three structural elements of the battery by screws means a simplification of the assembly of the latter, a significant gain of time in the assembly which favorably affects its cost. Furthermore, this assembly is very sturdy, thus providing enhanced reliability of the battery over time, relative to assemblies requiring welding or the use of glue, insulators or adhesive tapes.

This method of assembly also allows for easy replacement of one or several elements or cells which might be defective, by customer-service or maintenance personnel.

On the other hand, one obtains a very reliable contact, especially for strong currents, between the flex strip or each of the flexstrips and the terminals or poles of the elements or cells of the battery. The fact that each flex strip is firmly pressed against one of the terminals or poles of the cells or elements is of particular interest for strong currents in that it prevents electric losses and consequently heating at the contacts.

According to an advantageous method of execution, the flexible contact tabs continue to be pressed individually against the terminals of the cells by springs that are oriented in the direction of said terminals and anchored in the framework element of the contact and holding panels.

According to another characteristic arrangement, the contact surfaces of the contact strips with the terminals or positive and negative poles of the elements or cells are coated with conductive contact grease, known as such, the presence of this grease enhancing conduction and preventing corrosion at the contact points over a long period of use.

According to another characteristic arrangement, the interior face of each contact and holding panel is equipped with several flexstrips that are separated from each other and positioned in parallel.

The fact of using a number of flexstrips provides a solution, according to the present invention, that is significantly more reliable and economical, relative to the utilization of a single flexible connection circuit as proposed by the document U.S. Pat. No. 5,096,788.

Advantageously, each flex strip features two or more than two parallel alignments of flexible tabs.

According to a manufacturing method that is applicable to batteries featuring a plurality of alignments or lines of cells or elements separated by a gap or spacing, the flexstrips of one of the contact and holding panels are set off by a step relative to the flexstrips of the other contact and holding panel.

According to the invention, it is also possible to orient the positive and negative poles of the cells or elements seated in the through-holes of the separator-positioner casing and to position the flexstrips so as to permit an interconnection of said elements or cells: in a connection in parallel; or in a connection in series; or in a connection in parallel and in series at the same time.

In the case of batteries including lithium ion elements assembled in series/parallel requiring a voltage control and equalizing, the voltage can be measured and equalized per line of elements in parallel. In this case, the control and equalizing can be performed by means of an electronic board positioned inside the battery housing and connected to said flexstrips.

According to another characteristic arrangement, the flex strip or each flex strip is attached on the interior face of the framework element of the contact and holding panels by hooking it over pins provided on said face.

This arrangement allows precise, simple, and quick positioning of the flexstrips on the contact and holding panels. On the other hand, it ensures that the flexstrips are held in place when a contact and holding panel is removed, for instance, when customer-service of maintenance personnel needs to replace one or several defective elements.

According to another characteristic arrangement, one or several passages is or are made between the lateral surface of the elements and the interior surface of the through-holes in which said elements are seated, so as to provide circulation of cooling air along the latter.

According to a preferred method of execution, the holes or boxes in the separating and positioning case in which the cylindrical elements or cells of the battery are seated, without any notable play, present a polygonal section, preferably square in the aggregate.

By this arrangement, one obtains a circulation of cooling air along and around the cylindrical or prismatic elements or cells of the battery, while keeping the latter positioned without any significant play. This result is important, on account of the fact that during the charge or discharge of the elements or cells of the battery, particularly when the latter is composed of lithium-based (lithium ion or other) accumulators, an increase in temperature is produced in said accumulators, a temperature which it is highly desirable to equalize between the elements or cells, inside the battery, and to reduce.

To this same end, the structural element of at least one of the contact and holding panels fastened on each of the large faces of the separating and holding case is open-worked, preferably over its entire surface or extent. Advantageously, this applies to the upper panel or cover of the battery pack.

According to another characteristic arrangement, a portion of the screws of the screw works system providing the fastening of the contact and holding panels on the separating and holding case go through the spaces made between the flexstrips.

Due to this arrangement, the contact and holding panels are solidly fastened on the large faces of the separating and positioning case.

According to another characteristic arrangement, the screws going through the spaces made between the flexstrips are spread out so that their screwed axis finds itself in the center of the axes of a group of four elements or cells of the battery whereby it is possible to compress the springs and to ensure constant, firm and stable pressure of the four contact tabs surrounding the terminals of said four elements or cells oriented opposite said tabs.

The battery according to the invention is advantageously usable in all applications needing a high voltage power supply requiring the grouping of numerous base cells, such as, for example, electric vehicles, new-generation portable power tools, etc.

BRIEF DESCRIPTION OF THE DRAWINGS

The above aims, characteristics, and advantages, and yet others will become clearer from the following description and the attached drawings in which:

FIG. 2 is a plan view of the separating/holding case in the through-holes or cut-outs of which are seated the elements or cells of the battery where certain ones have been removed to facilitate description and understanding of the invention.

FIG. 3 is a plan view of the interior face of the upper panel or lid of the battery pack, one of the contact strips having been removed likewise to facilitate understanding of the description of the invention.

FIG. 4 is a plan view of the interior face of the lower panel or bottom of the battery pack, one of the contact strips having been unhooked to facilitate understanding of the description which follows.

FIG. 5 is a top view, with partial break-away, of the battery pack.

FIG. 6 is a longitudinal section view along the line 6-6 of FIG. 5.

FIG. 7 is a cross section along the line 7-7 of FIG. 5.

FIG. 8 is a detail plan view, and at a larger scale, showing the air circulation passages along the cells of the battery.

FIG. 9 is a cross sectional view along line 9-9 of FIG. 8.

FIG. 10 is an isolated view of the interior face of the contact and holding panel, with break-away, showing the fastening by hooking flexstrips on said interior face.

FIG. 11 is a cross section view along line 11-11 of FIG. 10.

FIG. 12 is a detailed cross section view, and at a larger scale, showing a method of anchoring the springs so as to press the contact tabs against the positive or negative poles of the cells.

FIG. 13 is a detailed front view, and at a larger scale, showing the distribution of the pressure springs inside the space defined by the perimeter of the battery pack.

FIG. 14 is an exploded perspective view illustrating an example of positioning of the interconnecting strips relative to the opposing poles of an assembly of cells.

FIG. 15 is a perspective view, with partial break-away, illustrating a battery according to the invention, provided with its protective housing or cover.

FIG. 16 is a perspective view, with partial break-away, showing a portable battery according to the invention, located in a sack of the backpack kind.

FIG. 17 is a schematic view analog to FIG. 16, illustrating a method of production of the portable battery, according to which one the exterior parts of the housing containing the battery pack, is an integral part of the carrying device.

DETAILED DESCRIPTION OF THE INVENTION

Figure 1:
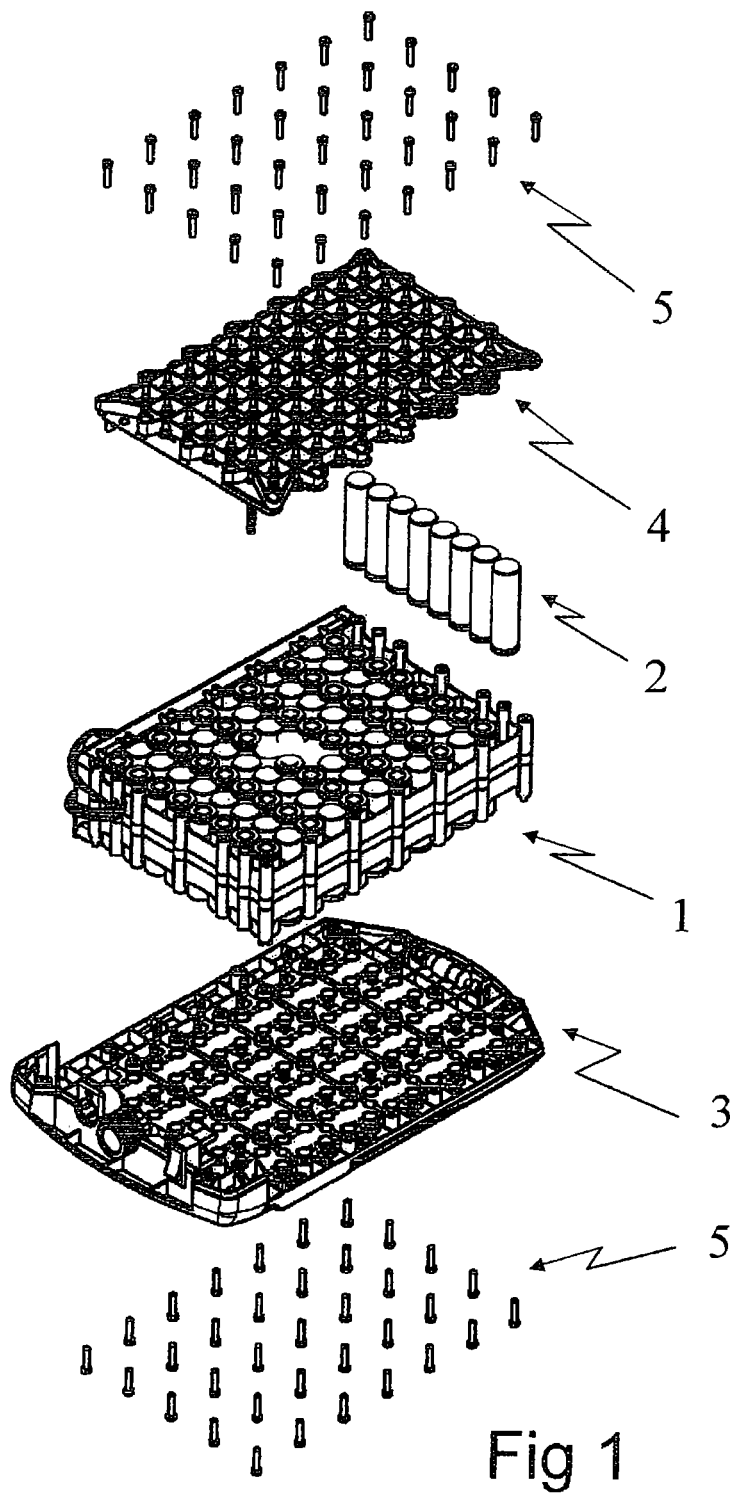
FIG. 1 is an exploded perspective view of the three constitutive parts of a battery pack according to the invention.

Reference is made to said drawings to describe an advantageous, although by no means limiting, example of manufacture, of the battery without welding, according to the invention. In the following description and in the claims, the term "cell" designates a rechargeable base accumulator, preferably of a cylindrical shape, which is most often called an "element" in technical French. The word "plurality" designates a number higher than two and, in the context of the present invention, it must be understood as the equivalent of the term "numerous" or of the expression "large number". The words "bottom" and "lid" are purely conventional and their meaning is simply to distinguish the contact and holding panels when this is necessary. The expression "battery pack" designates the assembly constituted by the three main parts of the battery.

The battery, according to the invention, in its function of storing electrical energy, is essentially constituted by three parts, namely: a separator-positioner 1 in which are housed individually the electrical energy storage cells 2; two contact and holding panels 3 and 4 fastened by means of screws 5 on the large faces opposite of said separator-positioner 1.

The separator-positioner 1 is primarily constituted by a casing, for instance in a general rectangular shape; this casing featuring a plurality of openings or through-holes 6 of an advantageously polygonal, preferably in the aggregate square section. These openings 6 are so dimensioned as to enclose the preferably cylindrical cells 2, seated without any notable play in said openings. Because of this fitting, passages 7 are created along the cells 2 positioned in the casing 1, so as to allow for the circulation of cooling air along and around said cells (FIGS. 8 and 9).

The openings 6 are located on several parallel lines or alignments. Their number may vary depending on the intended use of the batteries. For example, the casing 1 may be provided with 96 holes 6 more or less, distributed in twelve alignments of eight holes each.

The openings 6 present, preferably and advantageously, a length L inferior to the length I of the cells 2, so that when the latter are positioned in the casing 1, their opposing ends constituted by their positive and negative terminals emerge from the open ends of said openings (FIG. 9).

The contact and holding panels 3 and 4 feature a framework 8 on the interior face of which is positioned and fastened at least on contact strip 9 and, preferably, several contact bands 9 (FIGS. 3 and 4) ensuring the electrical interconnection of the elements 2 of the battery, when said panels 3 and 4 are assembled to the central separator-positioner 1. The contact strips 9 are preferably made of a flexible material, and may be constituted by thin blades of any electricity-conducting and non-oxidizing metal, for example thin strips of nickel-plated copper.

In the case of lithium ion cells being used, one of the ends of the contact strips 9 is equipped with a clip 9a for connecting to the voltage measuring system of the battery and to the equalizing system of the cells during the charge.

The two contact strips 9 placed at the ends of the row of flexstrips are also equipped with a second clip 9b that is connected to the positive and negative terminals, respectively, of the battery, these clips being meant to be connected to a powered device or machine, and/or a battery charger.

The framework element 8 of at least one of the contact and holding panels 3, 4 is perforated, preferably over its entire surface or extent, to allow cooling air to circulate through said panel(s).

The casing 1 and the framework element 8 of panels 3 and 4 may be made of any appropriate rigid plastic material, for example polyamide 6.

According to another interesting characteristic of the invention, the contact strip 9, or each contact strip 9, features a plurality of flexible tabs 10 which are, preferably, cutouts in said flex strip(s). These flexible tabs 10 are kept pressed, individually, against the positive or negative terminals or poles of the cells 2, by distinct means of pressure, with which is equipped, for example, the interior surface of the framework element of the panels and of which an interesting method of execution is described below. The contact tabs 10 could also be made of a plastic material, so as to constitute by themselves the pressure device or spring holding them pressed against the poles of the cells 2.

Preferably, the interior face of each contact and holding panel 3 and 4 is equipped with several flexstrips 9, separated from each other and positioned in parallel. Each contact strip 9 features at least two parallel alignments of flexible tabs 10.

Advantageously, the flex strip or each flex strip 9 is fastened against the interior face of the framework element 8 of the contact and holding panels 3 and 4, by hooking them over the pins 11 said face is equipped with (FIGS. 10-12).

According to another advantageous arrangement of the invention, the positive and negative poles of the cells 2 positioned in the casing 1 and the contact strips 9 are organized so as to achieve: either the mounting in parallel of said cells; or their mounting in series; or their mounting in series and in parallel.

The cells 2 positioned in the casing 1 form several alignments or lines of parallel elements the axes of which are separated by a distance of step p and according to a characteristic arrangement of the invention, the flexstrips 9' of one of the contact and holding panels are offset by a step p, relative to the contact strips 9'' of the other contact panel (FIG. 14).

According to a very efficacious method of execution, the interior face of the framework element 8 of the panels 3 and 4 is equipped with a plurality of springs oriented towards the positive or negative terminals of the cells 2 and pushing against the flexible tabs 10 of the contact strips 9 thereby enabling said flexible tabs 10 to be pushed individually against said terminals.

These springs are, preferably, constituted by helical springs 12 anchored permanently, through the intermediary of one of their ends, in the framework element 8 of the panels 3 and 4 (FIG. 12).

As previously indicated, the contact and holding panels 3 and 4 are assembled, by means of screws 5, to the central separator-positioner 1. A portion of the screws of the screw works ensuring this assembly goes through the spaces 13 created between the contact strips 9. The screws 5 are screwed into distance sleeves 15 which the casing 1 has on its periphery and inside the space delimited by the latter. The distance sleeves 15 are of slightly greater height than the casing, so that they protrude on each face of the casing 1.

Advantageously, the screws 5 going through the spaces 13 created between the contact strips 9 are distributed so that their screwing axis finds itself situated in the center of axes of a group of four springs 12a, 12b, 12c, 12d, and of four cells 2a, 2b, 2c, 2d or 2a1, 2b'', 2c1, 2d'' positioned in the casing 1 (FIG. 13). This multiplicity of assembly points and their well thought-out distribution serve to provide a sturdy assembly of the three parts of the battery pack, as well as constant and stable pressure of all the flexible contact tabs 10 on the positive and negative poles or terminals of the cells 2.

This direct and stable contact of the tabs 10 of the interconnecting strips 9 and the positive and negative poles of the cells 2 allows for very precise measuring of the voltage of said cells, because of the fact that with this contact there is very low resistance which does not falsify the measurements which are necessary, especially in the case of lithium-ion batteries.

Advantageously, the contact surfaces of the flexible tabs 10 of the interconnecting strips 9 with the positive and negative poles of the cells 2 are coated with conductive contact grease known as such.

The contact and holding panels 3 and 4 may be essentially identical and may constitute, with the separator-positioner 1 and the cells 2, a battery pack which can be seated in a housing or shell 14. Alternately, the contact and holding panels 3 and 4 may be fitted so as to constitute directly the housing of the battery, the panel 3 constituting, for example, the bottom of this housing the lid of which is, in this case, formed by the panel 4. According to another method of execution, the lower panel constitutes the bottom of a housing the remaining part of which is formed by a hood attached, in a removable manner, to said bottom.

Neither the means for linking the contact strips to the connection terminals which make it possible to connect the battery to power tools or to chargers nor the electronic circuit ensuring proper functioning and safety of the battery are described here, as the expert is well familiar with these means and circuits.

Another characteristic of the battery 16 produced in the manner described above is that it is portable.

It may be placed in a backpack of the rucksack type 17 (FIG. 15), or one of the exterior parts of the housing 14 of the battery 16 or of the battery pack may be provided with straps or suspenders 18, so they can be carried piggy-back (FIG. 16).

I claim:

1. A battery apparatus comprising:
   a separating and positioning casing having a plurality of through-holes formed therein;
   a plurality of cells seating respectively in said plurality of through-holes of said separating and positioning casing;
   a first contact and holding panel having an interior face;
   a second contact and holding panel having an interior face, said separating and positioning casing sandwiched between said first and second contact and holding panels; and
   a plurality of contact strips fastened without welding against said interior faces of said first and second contact and holding panels, said plurality of contact strips electrically interconnecting said plurality of cells, each of said plurality of contact strips being formed of a flexible conductive material, each of plurality of contact strips having a plurality of flexible contact tabs cut out in the contact strip, said plurality of flexible contact tabs pressing respectively against a terminal of said plurality of cells by action of resilient members distributed over the interior face of the contact and holding panel, said resilient members fastened by screws onto said separating and positioning casing, said plurality of cells comprising a first line of cells spaced by a distance from a second line of cells, the contact strips of one of said first and second contact and holding panels offset by said distance from the respective contact strips of the other of said first and second contact and holding panel; said plurality of cells comprising a first line of cells spaced by a distance from a second line of cells, the contact strips of one of said first and second contact and holding panels offset by said distance from the respective contact strips of the other of said first and second contact and holding panel.

2. The battery apparatus of claim 1, each of said resilient members being a spring oriented toward the terminal.

3. The battery apparatus of claim 1, said plurality of contact strips arranged in spaced parallel relation to each other on the interior face of the contact and holding panel.

4. The battery apparatus of claim 3, each contact strip of said plurality of contact strips having a parallel arrangement of said plurality of flexible contact tabs.

5. The battery apparatus of claim 3, said plurality of cells and said plurality of contact strips being mounted in parallel relation.

6. The battery apparatus of claim 3, said plurality of cells and said plurality of contact strips being mounted in series.

7. A battery apparatus comprising:
   a separating and positioning casing having a plurality of through-holes formed therein;
   a plurality of cells seating respectively in said plurality of through-holes of said separating and positioning casing;
   a first contact and holding panel having an interior face;
   a second contact and holding panel having an interior face, said separating and positioning casing sandwiched between said first and second contact and holding panels; and
   a plurality of contact strips fastened without welding against said interior faces of said first and second contact and holding panels, said plurality of contact strips electrically interconnecting said plurality of cells, each of said plurality of contact strips being formed of a flexible conductive material, each of plurality of contact strips having a plurality of flexible contact tabs cut out in the contact strip, said plurality of flexible contact tabs pressing respectively against a terminal of said plurality of cells by action of resilient members distributed over the interior face of the contact and holding panel, said resilient members fastened by screws onto said separating and positioning casing, each of the interior faces having pins extending therefrom, the contact strip fastened to the interior face by hooking over the pins.

8. The battery apparatus of claim 7, each of said plurality of through-holes having a space between a wall thereof and an outer face of the cell received therein so as to allow cooling air to pass therethrough.

9. The battery apparatus of claim 8, each of said plurality of through-holes having a polygonal shape.

10. The battery apparatus of claim 7, at least one of said first and second contact and holding panels having a perforated framework element so as to allow cooling air to circulate through the panel.

11. A battery apparatus comprising:
    a separating and positioning casing having a plurality of through-holes formed therein;
    a plurality of cells seating respectively in said plurality of through-holes of said separating and positioning casing;
    a first contact and holding panel having an interior face;
    a second contact and holding panel having an interior face, said separating and positioning casing sandwiched between said first and second contact and holding panels; and
    a plurality of contact strips fastened without welding against said interior faces of said first and second contact and holding panels, said plurality of contact strips electrically interconnecting said plurality of cells, each of said plurality of contact strips being formed of a flexible conductive material, each of plurality of contact strips having a plurality of flexible contact tabs cut out in the contact strip, said plurality of flexible contact tabs pressing respectively against a terminal of said plurality of cells by action of resilient members distributed over the interior face of the contact and holding panel, said resilient members fastened by screws onto said separating and positioning casing, each of said screws passing into a space between adjacent contact strips of said plurality of contact strips.

12. The battery apparatus of claim 11, each of the screws having a screwing axis positioned centrally of a group of four cells of said plurality of cells.

13. The battery apparatus of claim 11, each of said screws being screwed into respective sleeves on said separating and positioning casing.

14. The battery apparatus of claim 11, each of said plurality of contact strips having a conductive surface coated within a conductive grease.

15. The battery apparatus of claim 11, each of said plurality of through-holes of said separating and positioning casing having a length less than a length of each of said plurality of cells such that positive and negative terminals of the cells emerge outwardly on opposite sides of said separating and positioning casing.

16. The battery apparatus of claim 11, further comprising:
    a shell receiving said separating and positioning casing and said plurality of cells of said first and second contact and holding panels therein; and
    a strap affixed to said casing.

\* \* \* \* \*